US011489256B2

(12) United States Patent
Foglia Manzillo et al.

(10) Patent No.: US 11,489,256 B2
(45) Date of Patent: Nov. 1, 2022

(54) WIRELESS TRANSMITTER THAT PERFORMS FREQUENCY MULTIPLEXING OF CHANNELS

(71) Applicant: Commissariat à l'Energie Atomique et aux Energies Alternatives, Paris (FR)

(72) Inventors: Francesco Foglia Manzillo, Grenoble (FR); Antonio Clemente, Grenoble (FR); José-Luis Gonzalez Jimenez, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 41 days.

(21) Appl. No.: 17/108,121

(22) Filed: Dec. 1, 2020

(65) Prior Publication Data

US 2021/0175623 A1   Jun. 10, 2021

(30) Foreign Application Priority Data

Dec. 5, 2019   (FR) ...................... 19 13796

(51) Int. Cl.
*H01Q 3/42* (2006.01)
*H01Q 3/22* (2006.01)
(Continued)

(52) U.S. Cl.
CPC ................ *H01Q 3/42* (2013.01); *H01Q 3/22* (2013.01); *H04B 1/0096* (2013.01); *H04B 1/08* (2013.01)

(58) Field of Classification Search
CPC ... H01Q 3/22; H01Q 3/42; H01Q 3/46; H04B 1/08; H04B 1/0096; H04B 7/06
See application file for complete search history.

(56) References Cited

U.S. PATENT DOCUMENTS 5,389,939 A   2/1995   Tang et al.
9,099,775 B2  8/2015   Dussopt et al.
(Continued)

FOREIGN PATENT DOCUMENTS

EP   3 125 362 B1   5/2018
FR   3 079 075 A1   9/2019
(Continued)

OTHER PUBLICATIONS

French Preliminary Search Report dated Jul. 1, 2020 in French Application 19 13796 filed on Dec. 5, 2019 (with English Translation of Categories of Cited Documents & Written Opinion), 11 pages.

(Continued)

*Primary Examiner* — Daniel Munoz
(74) *Attorney, Agent, or Firm* — Oblon, McClelland, Maier & Neustadt, L.L.P.

(57) ABSTRACT

A transmit-array collimating assembly, this collimating assembly being able to convert a first electromagnetic wave radiated from a first focal point and in a first frequency band, into a plane electromagnetic wave of same frequency radiated in a preset first direction, and to convert a second electromagnetic wave radiated from a second focal point and in a second frequency band, into a plane electromagnetic wave of same frequency radiated in the same preset first direction, first and second primary radiating elements solely connected to first and second output ports of a transmitting module, respectively. The first and second primary radiating elements are positioned so as to radiate the first and second electromagnetic waves from the first and second focal points, respectively.

22 Claims, 2 Drawing Sheets

(51) Int. Cl.
    *H04B 1/00*     (2006.01)
    *H04B 1/08*     (2006.01)

(56) References Cited

U.S. PATENT DOCUMENTS

| | | |
|---|---|---|
| 9,941,592 B2 | 4/2018 | Clemente et al. |
| 10,720,716 B2 | 7/2020 | Clemente |
| 2010/0207833 A1 | 8/2010 | Toso et al. |
| 2021/0234592 A1* | 7/2021 | Ashrafi ................ H04B 7/0617 |

FOREIGN PATENT DOCUMENTS

| | | |
|---|---|---|
| WO | WO 2012/085067 A1 | 6/2012 |
| WO | WO 2014/158107 A1 | 10/2014 |

OTHER PUBLICATIONS

Pham et al., "Dual-Band Transmitarrays With Dual-Linear Polarization at Ka-Band", IEEE Transactions on Antennas and Propagation, vol. 65, No. 12, Dec. 2017, 10 pages.

Dussopt et al., "A V-Band Switched-Beam Linearly Polarized Transmit-Array Antenna for Wireless Backhaul Applications", IEEE Transactions on Antennas and Propagation, vol. 65, No. 12, Dec. 2017, 6 pages.

Abdelrahman et al., "Bandwidth Improvement Methods of Transmitarray Antennas", IEEE Transactions on Antennas and Propagation, vol. 63, No. 7, Jul. 2015, 9 pages.

Ge et al., "Broadband Folded Transmitarray Antenna Based on an Ultrathin Transmission Polarizer", IEEE Transactions on Antennas and Propagation, vol. 66, No. 11, Nov. 2018, 8 pages.

Xiao et al., "Wideband Planar Tightly Coupled Dipole Transmitarray", $13^{th}$ European Conference on Antennas and Propagation (EuCAP 2019), 2019, 4 pages.

Tuloti et al., "High-Efficient Wideband Transmitarray Antenna", IEEE Antennas and Wireless Propagation Letters, vol. 17, No. 5, May 2018, 4 pages.

Roemisch et al., "Multibeam Planar Discrete Millimeter-Wave Lens For Fixed-Formation Satellites", 2002, 4 pages.

Miao et al., "140 GHz High-Gain LTCC-Integrated Transmit-Array Antenna Using a Wideband SIW Aperture-Coupling Phase Delay Structure", IEEE Transactions on Antennas and Propagation, vol. 66, No. 1, Jan. 2018, 9 pages.

Foglia Manzillo et al., "Low-Cost, High-Gain Antenna Module Integrating a CMOS Frequency Multiplier Driver for Communications at D-band", IEEE Radio Frequency Integrated Circuits Symposium, 2019, 4 pages.

Jouanlanne et al., "Wideband Linearly Polarized Transmitarray Antenna for 60GHz Backhauling", IEEE Transactions on Antennas and Propagation, vol. 65, No. 3, Mar. 2017, 6 pages.

* cited by examiner

WIRELESS TRANSMITTER THAT PERFORMS FREQUENCY MULTIPLEXING OF CHANNELS

The invention relates to a wireless transmitter that performs frequency multiplexing of channels and to a wireless receiver that performs frequency demultiplexing of channels.

Such a transmitter and such a receiver are used to set up a plurality of communication channels simultaneously. Each of these channels serves as a medium for a data-transmission link. The data-transmission links are set up simultaneously on each of the channels and may be independent of one another.

Each channel corresponds to a frequency band reserved for this communication channel. This reserved frequency band is centred on a central frequency $f_i$ and bounded on either side of the frequency $f_i$ by a lower limit f $min_i$ and an upper limit f $max_i$. Here, in this patent application, the index i is an identifier of the channel, which allows the channel i to be distinguished from all the other channels used by the transmitter and receiver. Below, the frequency band reserved for a channel i is called the "frequency band $BW_i$".

The various frequency bands $BW_i$ used by the transmitters and receivers are separate. In particular, these frequency bands $BW_i$ do not overlap in order to guarantee the independence of the channels with respect to one another.

Preferably, such a transmitter must have the following advantages:
- it is highly directional and has a high gain in the transmission direction;
- it also has a wide passband.

By "high gain" in the transmission direction, what is meant here is a gain higher than 20 dBi and preferably higher than 25 dBi or 30 dBi. By "wide passband", what is meant in this patent application is a −3 dB passband the width of which is larger than 15%, and preferably larger than 20%. A passband larger than z % means that the passband is larger than $z \times f_c/100$, where:
- "x" is the symbol that designates scalar multiplication, and
- $f_c$ is the central frequency of this −3 dB passband.

The following document is known from the prior art: Pham Kien et al.: "Dual-Band Transmitarray With Dual-Linear Polarization at Ka-Band", IEEE Transactions on antennas and propagation, vol. 65, no 12, Jan. 12, 2017, pages 7009-7018. This document describes a particular transmit-array comprising a transmit-subarray for electromagnetic-wave transmission and another subarray for electromagnetic-wave reception. This article does not describe frequency multiplexing of a plurality of channels on transmission or of a plurality of channels on reception.

The invention aims to provide a wireless transmitter that performs frequency multiplexing of channels and that has an improved radiation efficiency. One subject thereof is therefore such a transmitter.

Another subject of the invention is a wireless receiver that performs frequency demultiplexing of channels and that is able to receive the electromagnetic waves transmitted by the above transmitter.

The invention will be better understood on reading the Mowing description, which is given solely by way of non-limiting example, and with reference to the drawings, in which.

In these figures, the same references have been used to designate the same elements. In the remainder of this description, the features and functions that are well known to a person skilled in the art are not described in detail.

In this description, detailed examples of embodiments are first described in Section I with reference to the figures. Next, in the following section, Section II, variants of these embodiments are presented. Lastly, the advantages of the various embodiments are presented in Section III.

SECTION I: EXAMPLES OF EMBODIMENTS

Figure 1:
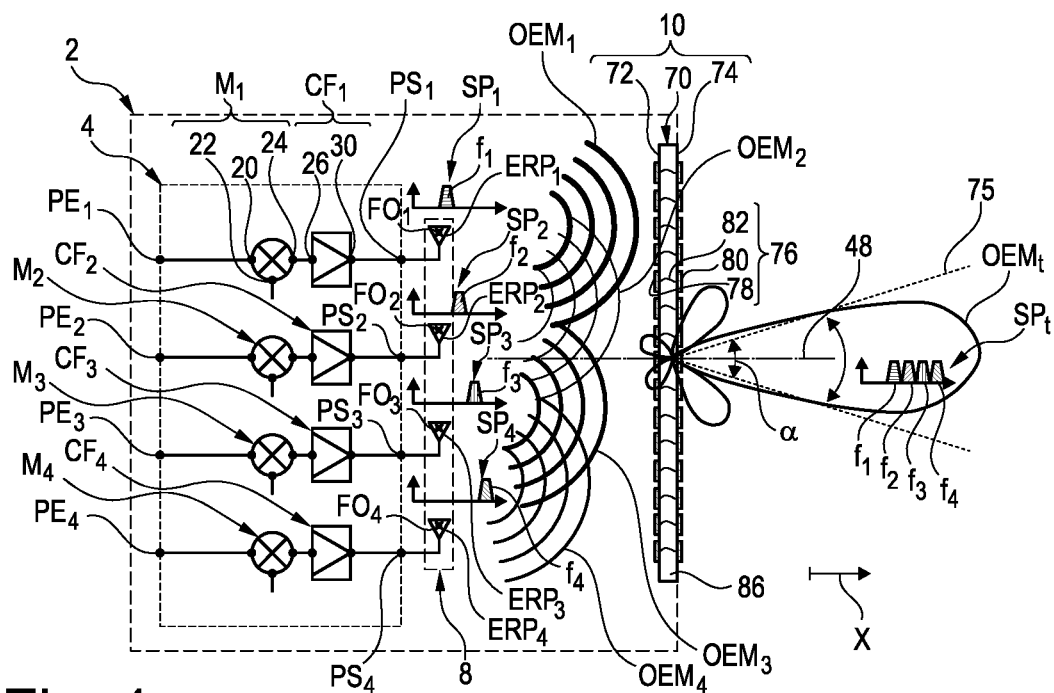
FIG. 1 is a schematic illustration of a wireless transmitter that performs frequency multiplexing of channels.

FIG. 1 shows a wireless transmitter 2 that performs frequency multiplexing of channels. The transmitter 2 is able to set up a plurality of communication channels with a receiver, simultaneously. Each of these channels serves as a medium for a data-transmission link between the transmitter 2 and this receiver. These data-transmission links are independent from one another. In particular, the information transmitted over a particular channel may be independent of the information transmitted, at the same time, over other channels of the transmitter 2.

Each channel i corresponds to a frequency band BW reserved for this channel i. Here, the index i is an integer comprised between 1 and Nc max, where Nc max is the maximum number of channels used by the transmitter 2. Here, the various frequency bands $BW_i$ are contiguous to one another and lie in a frequency range [f $min_t$; f $max_t$], where f $min_t$ and f $max_t$ are equal to the lowest of the limits f $min_i$ and to the highest of the limits f $max_i$, respectively. Preferably, the various frequency bands $BW_i$ are contiguous to one another in the range [f $min_t$; f $max_t$], so as to make the best possible use of this frequency range.

For example, in this embodiment, the number Nc max is equal to four and the index i is therefore comprised between 1 and 4. Here, the range [f $min_t$; f $max_t$] is located in the frequency band comprised between 110 GHz and 170 GHz. This frequency band is known as the "D band". It is a frequency band in which the electromagnetic waves are millimetre waves. This frequency band is particularly advantageous because it allows bit rates higher than or equal to 10 Gbit/s to be achieved over short-range wireless links.

The transmitter 2 notably comprises:
- a transmitting module 4;
- a set 8 of primary radiating elements, and
- a collimating assembly 10.

The module 4 generates the modulated electrical signals that must then be radiated into space by the set 8 of primary radiating elements and the collimating assembly 10. To this end, the module 4 comprises one input port $PE_i$ for each channel i. The port $PE_i$ receives the data, for example coded in binary, that must be transmitted over the channel i. Here, the module 4 comprises four input ports $PE_1$ to $PE_4$. The signals received via the ports $PE_1$ to $PE_4$ are for example baseband signals.

The module 4 also comprises four output ports $PS_1$ to $PS_4$ on which it generates four modulated electrical signals called $SEM_1$ to $SEM_4$ below, respectively. Each signal $SEM_i$ is able to be radiated by a respective primary radiating element of the set 8 then by the collimating assembly 10 in a respective frequency range $BW_i$ comprised between f $min_i$ and f $max_i$.

Each port $PE_i$ is connected to the corresponding port $PS_i$ by way of, successively, a modulator $M_i$ and a forming circuit $CF_i$. In this description, unless otherwise indicated, the term "connect" means "electrically connect".

The modulator $M_1$ is able to modulate, for example, a carrier received via a second input 22 depending on the data received via its input 20, in order to generate an initial modulated electrical signal. This initial modulated electrical signal is delivered to an output 24 of the modulator $M_1$. For example, in this embodiment, most of the power of the initial modulated electrical signal is comprised in a frequency band $K_1$ itself comprised in the frequency band K. Here, the band $K_1$ is located in the frequency band extending from 13.75 GHz to 21.25 GHz. Next, the modulator $M_1$ transposes the K-band initial modulated electrical signal into a corresponding D-band modulated electrical signal. For example, the frequency transposition performed by the modulator $M_1$ possibly is carried out using frequency multipliers as described, for example, in the following article: F. Foglia Manzillo et al.: "*Low-cost, High-Gain Antenna Module Integrating a CMOS Frequency Multiplier Driver for Communications at D-band*", IEEE Radio Frequency Integrated Circuits Symposium, June 2019. Below, this article is simply called "article A1".

Here, the modulator $M_1$ therefore converts the initial electrical signal into an electrical signal modulated in the same way but in the frequency band $BW_1$. Here, the expression "a signal modulated in the frequency band BW" is understood to mean that most of the power of this modulated signal is located in this frequency band BW.

The expression "most of the power of a signal is comprised in a frequency band BW" is understood to mean that at least 70% and, preferably, at least 90% or 95% of the power of this signal is comprised in this frequency band BW. In other words, the area of the power spectrum of this signal comprised in the band BW represents more than 70% and, preferably, more than 90% or 95% of the total area of this power spectrum.

The output 24 is connected to an input 26 of a circuit $CF_1$ for forming the electrical signal modulated in the band $BW_1$. Typically, the circuit $CF_1$ carries out the amplification and filtering required to transmit the signal modulated in the band $BW_1$ over the air via a primary radiating element $ERP_1$. The circuit $CF_1$ generates, on an output 30, the modulated electrical signal $SEM_1$ from the electrical signal received via its input 26.

A spectrum $SP_1$ of the power of the signal $SEM_1$ is schematically shown next to the circuit $CF_1$. This spectrum $SP_1$ illustrates the fact that most of the power of the signal $SEM_1$ is located in the frequency band $BW_1$. In the figures, the frequency band $BW_i$ of a power spectrum is indicated by an arrow $f_i$.

The output 30 of the circuit $CF_1$ is connected to the output port $PS_1$.

The modulators $M_2$, $M_3$ and $M_4$ are identical to the modulator $M_1$ except that most of the power of the initial modulated electrical signals that they generate is comprised in separate bands $BW_2$, $BW_3$ and $BW_4$, respectively.

The circuits $CF_2$ to $CF_4$ are, for example, identical to the circuit $CF_1$ except that they are designed to work in the bands $BW_2$, $BW_3$ and $BW_4$, respectively.

The power spectra $SP_2$ to $SP_4$ of the signals $SEM_2$ to $SEM_4$, respectively, are schematically shown near the corresponding circuits $CF_2$ to $CF_4$, respectively. As can be seen in the spectra $SP_1$ to $SP_4$, the modulated electrical signals $SEM_1$ to $SEM_4$ are modulated in separate frequency bands $BW_1$ to $BW_4$, respectively.

The set 8 of primary radiating elements radiates into space, towards the collimating assembly 10, each of the signals $SEM_1$ to $SEM_4$. To this end, it comprises Ner primary radiating elements, where Ner is higher than or equal to Nc max. In this embodiment, the set 8 comprises as many primary radiating elements as there are channels i and therefore as many primary radiating elements as there are output ports $PS_i$. In the figures, the four primary radiating elements have been designated by the references $ERP_1$ to $ERP_4$, respectively. Each radiating element $ERP_i$ is connected, here directly, only to the corresponding output port $PS_i$ of the module 4. Reciprocally, each port $PS_i$ is connected, in this embodiment, only to the corresponding primary radiating element $ERP_i$.

Here, each primary radiating element $ERP_i$ is able to convert the received electrical signal $SEM_i$ into an electromagnetic wave $OEM_i$ modulated in the same way and in the same frequency band $BW_i$. In addition, each radiating element $ERP_i$ radiates the wave $OEM_i$ in the direction of the collimating assembly 10.

In this embodiment, by way of illustration, the various primary radiating elements $ERP_i$ are all identical. Thus, each primary radiating element $ERP_i$ has a −3 dB passband that starts before the limit f $min_t$ and that ends beyond the limit f $max_t$.

Typically, each primary radiating element $ERP_i$ is configured so that most of the emitted electromagnetic wave $OEM_i$ is received by the collimating assembly 10. For example, each of the primary radiating elements $ERP_i$ is arranged to irradiate the entirety or practically the entirety of an interior face 72 of the collimating assembly 10.

The wave fronts of the waves $OEM_i$ are, for example, spherical and generally not plane. In addition, the primary radiating elements $ERP_i$ are arranged so that the emitted waves $OEM_i$ have the same polarity.

Here, to facilitate integration of the set 8 of primary radiating elements into an integrated circuit, the set 8 is a planar antenna array, i.e. it mainly lies in a plane. Here, this plane is perpendicular to an axis 48 on which the collimating assembly 10 is centred.

To this end, the set 8 comprises a printed circuit board 50 (FIG. 2) and the primary radiating elements $ERP_i$ are produced on a front face 52 (FIG. 2) of this board 50. Typically, the primary radiating elements $ERP_i$ are etched in a metallization layer of the front face 52.

In this exemplary embodiment, the set 8 is a patch antenna. Each radiating element $ERP_i$ corresponds to one of the patches of this antenna. The ground plane of this set 8 of primary radiating elements is typically produced in a metallization layer of the board 50 that is buried between the face 52 and a rear face 54 (FIG. 2) located on the side opposite the front face 52.

Figure 2:
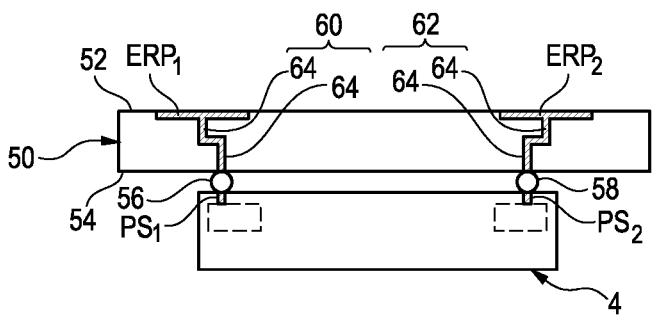
FIG. 2 is a schematic illustration, in cross section, of a detail of the transmitter of FIG. 1.

To minimize bulk and to facilitate the manufacture of the module 4 and of the set 8 of primary radiating elements, the module 4 takes the form of an integrated circuit soldered to the rear face 54 of the board 50. In addition, the electrical links that directly connect each output port $PS_i$ to the corresponding radiating element $ERP_i$ are, for example, produced using vias that pass through the thickness of the board 50. By way of illustration, FIG. 2 shows the output ports $PS_1$ and $PS_2$ soldered to the rear face 54 of the board 50 by way of solder bumps 56 and 58, respectively. FIG. 2 also shows two electrical links 60 and 62 that directly connect the output ports $PS_1$ and $PS_2$ to the radiating elements $ERP_1$ and $ERP_2$, respectively. The links 60 and 62 are produced using vias 64 that pass through some or all of the thickness of the board 50.

The collimating assembly 10 is able to re-radiate the various received electromagnetic waves in a common propagation direction represented by an arrow X in the figures. This allows high gains to be achieved in said direction. In this first embodiment, the direction X is parallel to the axis 48. In this embodiment, the transmitter 2 is a directional transmitter, i.e. the power of the wide-band electromagnetic wave $OEM_t$ transmitted by the transmitter 2 is located mainly in an irradiation cone 75. Here, an irradiation cone is defined as being the cone such that the power of the electromagnetic wave outside of this cone is two times lower than the maximum power of the electromagnetic wave in this cone. This cone 75 is here a cone of revolution the axis of revolution of which is coincident, in this embodiment, with the axis 48. The angle α at the apex of the cone 75 is smaller than 45° and, preferably, smaller than 25° or 10° or 5°. The angle α is also known as the "−3 dB aperture angle". Thus, a receiver located outside of this cone 75 is unable or able only with great difficulty to receive the electromagnetic wave $OEM_t$.

The wave $OEM_t$ has a planar or practically planar wave front radiated from an exterior face 74 of the collimating assembly 10. This wave front is perpendicular to the direction X.

Here, for each frequency band $BW_i$, the collimating assembly 10 has one focal point $FO_i$. In this patent application, the term "focal point" designates the phase centre of the electromagnetic radiation. The focal point $FO_i$ has the following property: when an electromagnetic wave is radiated from this focal point $FO_i$ in the frequency band $BW_i$, then this electromagnetic wave is converted by the collimating assembly 10 into a plane electromagnetic wave directed in the direction X. This property is true solely for the electromagnetic wave in the frequency band $BW_i$ that is radiated from the focal point $FO_i$. Thus, this property is false notably for an electromagnetic wave radiated from the focal point $FO_i$ but in a different frequency band to the frequency band $BW_i$ or for an electromagnetic wave in the frequency band $BW_i$ but radiated from a point other than the focal point $FO_i$.

Thus, the focal point $FO_i$ is the point to or on which the collimating assembly 10 directs or focuses plane electromagnetic waves received via its exterior face 74 along the direction X when these plane electromagnetic waves are in the frequency band $BW_i$. Conversely, here, the collimating assembly 10 converts any spherical electromagnetic wave emitted from the focal point $FO_i$ into a plane electromagnetic wave radiated in the direction X when this spherical electromagnetic wave is in the frequency band $BW_i$. Here, by "spherical electromagnetic wave", what is meant is an electromagnetic wave the wave front of which is spherical. When such a spherical electromagnetic wave is emitted from the focal point $FO_i$, the centre of the spherical wave front is located on this focal point $FO_i$.

Preferably, the collimating assembly 10 is a transmit-array collimating assembly, i.e. a collimating assembly produced using one or more transmit-array antennas. These antennas are well known in the field of beamforming.

In this first embodiment, the collimating assembly 10 comprises a single secondary transmit-array antenna 70. The antenna 70 comprises many elementary cells of various types. Each elementary cell mainly comprises:
- an interior radiating element placed on the face 72;
- an exterior radiating element placed on the face 74; and
- a link for transferring energy received by one of these radiating elements to the other.

By way of illustration, an example of elementary cells 76 is shown in FIG. 1. Production of elementary cells is well known. For example, a detailed description of elementary cells capable of being used to produce the antenna 70 is given in the following articles:

A. Abbaspour-Tamijani, K. Sarabandi, and G. M. Rebeiz, "Antenna-filter-antenna arrays as a class of bandpass frequency-selective surfaces," IEEE Trans. Microw. Theory Techn., vol. 52, no. 8, pp. 1781-1789, August 2004.

M. Li, M. A. Al-Joumayly, and N. Behdad, "Broadband true-time-delay microwave lenses based on miniaturized element frequency selective surfaces," IEEE Trans. Antennas Propag., vol. 61, no. 3, pp. 1166-1179, March 2013

Y. He and G. V. Eleftheriades, "Matched, Low-Loss, and Wideband Graded-Index Flat Lenses for Millimeter-Wave Applications," IEEE Trans. Antennas Propag., vol. 66, no. 3, pp. 1114-1123, March 2018.

A. Clemente, L. Di Palma, F. Diaby, L. Dussopt, T. K. Pham, and R. Sauleau, "Electronically-steerable transmitarray antennas for Kaband," Proc. 13th Eur. Conf. Antennas Propag., Krakow, Poland, April 2019.

Therefore, here, a detailed description of the elementary cells is not given.

The elementary cell 76 comprises an interior radiating element 78, an exterior radiating element 80 and a link 82 for transferring energy. The link 82 allows the energy received by the radiating element 78 to be transferred to the radiating element 80. The link 82 is also arranged to introduce a preset phase shift during this transfer of energy between the radiating elements 78 and 80. In addition, the elementary cell 76 comprises, for example, a ground plane that separates the radiating elements 78 and 80.

In this embodiment, the radiating element 80 emits an electromagnetic wave that is identical to, and of the same polarity as, the electromagnetic wave received by the element 78, but with a preset delay. This preset delay therefore introduces a preset phase shift between the electromagnetic wave received by the element 78 and the electromagnetic wave radiated by the element 80.

In this embodiment, the elementary cells used are elementary cells of the type referred to here as "multiband elementary cells". A multiband elementary cell is an elementary cell configured to have a −3 dB passband that covers a plurality of frequency bands $BW_i$. In this particular embodiment, these multiband elementary cells cover all of the frequency bands $BW_i$, i.e. the band $[f\ min_t, f\ max_t]$.

In addition, the preset delay or phase shift introduced by the multiband elementary cell varies depending on the frequency band $BW_i$ in which the received electromagnetic wave is located. For example, here, for each frequency band $BW_i$, the phase shift introduced is different from that introduced in the other frequency bands $BW_j$. Because of this property, a given arrangement of the cells 76 with respect to one another allows the various antenna 70 focal points $FO_i$ located in space in various locations to be obtained. A particular arrangement of elementary cells that allows the wave $OEM_i$ to be converted into a plane electromagnetic wave directed in the direction X when the wave $OEM_t$ is radiated from the focal point $FO_i$, forms the equivalent of a discrete lens. In this embodiment, there are four different focal points $FO_i$, and the antenna 70 therefore forms the equivalent of four different discrete lenses, one for each frequency band $BW_i$.

The multiband elementary cells allow the equivalent of these four discrete lenses to be formed using the same elementary cells. Thus, a given elementary cell 76 is used to direct, in the direction X, in combination with the other elementary cells of the antenna 70, the electromagnetic waves emitted from the various focal points $FO_i$ of the antenna 70. In this embodiment, the cells 76 are all placed in a single sector of the antenna 70, this single sector occupying the entirety of one face of the antenna 70.

All of the elementary cells of the same type introduce the same preset delay in the same frequency band $BW_i$ for all the possible values of the index i. Elementary cells of the same type therefore introduce the same phase shifts in the same frequency bands $BW_i$. Preferably, to simplify the design of the antenna 70, the elementary cells 76 are also configured so that the difference between the phase shifts of any two of the types of elementary cells is the same in all the bands $BW_i$.

The antenna 70 comprises Nce different types of elementary cells, where Nce is higher than or equal to two and, preferably, higher than or equal to four, eight or twelve. In addition, the Nce different types of elementary cells are configured to correspond to Nce different phase shifts distributed over 360°. Next, knowing the phase shift introduced by each type of elementary cells in the various bands $BW_i$, these elementary cells of various types are arranged with respect to one another so as to form the equivalent of the four desired discrete lenses. The design and manufacture of the antenna 70, such as specified here, is a routine task that is within the ability of a person skilled in the art to perform. In particular, various methods for obtaining a suitable arrangement of the elementary cells of the antenna 70 are known. These methods often employ software packages that allow the radiation of a transmit-array antenna to be simulated depending on the characteristics of each elementary cell and on their position with respect to one another, and taking into account the frequency of the radiated electromagnetic wave. In particular, multi-frequency array synthesis techniques may be applied. For example, the arrangement of the various types of elementary cells with respect to one another may be obtained using a method similar to that described in the following articles:

Y. Mao, S. Xu, F. Yang, and A. Z. Elsherbeni, "A novel phase synthesis approach for wideband reflectarray design", *IEEE Trans. Antennas Propag.*, vol. 63, no. 9, September 2015.

R. Deng, S. Xu and F. Yang, M. Li, "Single-Layer Dual-Band Reflectarray Antennas With Wide Frequency Ratios and High Aperture Efficiencies Using Phoenix Elements", *IEEE Trans. Antennas Propag.*, vol. 65, no. 2, pp. 612-622, February 2017.

M. Borgese, F. Costa, S. Genovesi, and A. Monorchio, "An Iterative Design Procedure for Multiband Single-Layer Reflectarrays: Design and Experimental Validation", *IEEE Trans. Antennas Propag.*, vol. 65, no. 9, September 2016.

P. Feng, S. Qu and S. Yang, "Octave Bandwidth Transmitarrays With a Flat Gain", *IEEE Trans. Antennas Propag.*, vol. 66, no. 10, pp. 5231-5238, October 2018.

Thus, the structure of each elementary cell of the antenna 70 and their arrangement with respect to one another are not described in more detail.

Here, each primary radiating element $ERP_i$ is centred on the focal point $FO_i$ that corresponds to the relevant frequency band $BW_i$.

To make it easier to manufacture the antenna 70 and to limit its bulk, the antenna 70 is a planar antenna manufactured from a printed circuit board 86. For example, the interior and exterior radiating elements are produced in metallization layers located on the faces 72 and 74, respectively. The ground plane that mutually separates the interior radiating element of an elementary cell from its exterior radiating element is then produced in a buried metallization layer located between the faces 72 and 74.

The transmitter 2 works as follows. The data to be transmitted simultaneously over the various channels i are received via the ports $PE_1$ to $PE_4$. Next, these data are modulated by the various modulators $M_i$ in order to obtain the various modulated electrical signals. The various modulated electrical signals are then formed by the circuits $CF_1$ to $CF_4$ in order to obtain the various electrical signals $SEM_1$ to $SEM_4$. Each of these electrical signals $SEM_1$ to $SEM_4$ is radiated by a respective primary radiating element $ERP_i$ in order to obtain the four modulated electromagnetic waves $OEM_1$ to $OEM_4$ in each of the frequency bands BM to $BW_4$. These electromagnetic waves $OEM_1$ to $OEM_4$ are received by the interior radiating elements of the antenna 70. The antenna 70 then converts all of the electromagnetic waves $OEM_1$ to $OEM_4$, which have various directions of incidence, into a plane electromagnetic wave radiated in the common direction X. The superposition of these plane electromagnetic waves, which is radiated in the direction X, forms the wave $OEM_t$.

FIG. 1 schematically shows a spectrum $SP_t$ of the wave $OEM_t$. This spectrum $SP_t$ shows that the radiated wave $OEM_t$ combines the powers of the various waves $OEM_1$ to $OEM_4$ emitted by the set 8. Therefore, the wave $OEM_t$ is a wide-band electromagnetic wave, most of the energy of which is comprised between the limits f $min_t$ and f $max_t$. In addition, the wave $OEM_t$ is a plane electromagnetic wave directed in the direction X, this allowing a high gain to be obtained.

In this embodiment, the combination of the power of the various electrical signals $SEM_1$ to $SEM_4$ generated on the various ports $PS_1$ to $PS_4$ occurs over the air and in particular, partially, between the set 8 and the antenna 70 and, mainly, after the exterior face 74. This over-the-air combination of power, which may be said to be over-the-air power multiplexing, occurs because the various electromagnetic waves radiated by the set 8 are of same polarity, and by virtue of the arrangement of the various types of elementary cell 76, which redirects all the waves $OEM_i$ in the same direction X. Thus, in the transmitter 2, it is not necessary to use a power combiner to this end. A power combiner does the same work as over-the-air power multiplexing but generates more losses, notably in the range of frequencies above 1 GHz. For example, in the domain of millimetre waves, such a power combiner generates insertion losses of about 3 dB. If over-the-air power multiplexing is employed, these losses are avoided and the radiation efficiency of the transmitter 2 is therefore increased.

In addition, a power combiner is often associated with a power splitter. This power splitter is required to feed the radiating elements and also generates insertion losses, which increase with the number of primary radiating elements.

Thus, use of over-the-air power multiplexing also allows these losses related to the use of a power splitter to be avoided.

Figure 3:
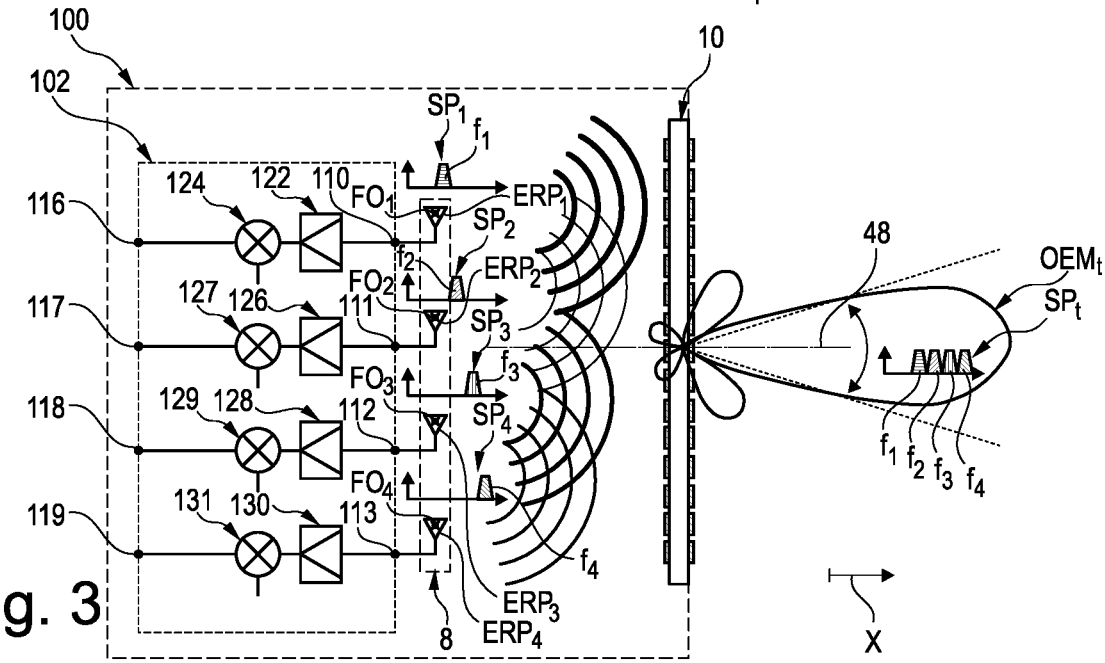
FIG. 3 is a schematic illustration of a wireless receiver that performs frequency demultiplexing of channels and that is able to receive the electromagnetic waves transmitted by the transmitter of FIG. 1.

FIG. 3 shows a receiver 100 able to receive the wave $OEM_t$ transmitted by the transmitter 2. The receiver 100 is identical to the transmitter 2 except that the transmitting module 4 has been replaced by a receiving module 102. The module 102 is able, on the basis of the modulated electrical signals received by the primary radiating elements $ERP_1$ to $ERP_4$, to deliver, to its output ports, the modulated data. To this end, the module 102 comprises:

four input ports 110 to 113 that are directly connected to the radiating elements $ERP_1$ to $ERP_4$, respectively, and
four output ports 116 to 119 to which the data received in channels 1 to 4 are delivered.

Between the input port 110 and the output port 116, the module 102 comprises, in succession, a forming circuit 122 and a demodulator 124.

The circuit 122 and the demodulator 124 perform operations that are the inverse of those performed by the circuit $CF_1$ and the modulator $M_1$, respectively. Therefore, this circuit 122 and this demodulator 124 are not described in more detail here. Similarly:

between the input port 111 and the output port 117, the module 102 comprises a forming circuit 126 and a demodulator 127 that perform operations that are the inverse of those performed by the circuit $CF_2$ and the modulator $M_2$, respectively, between the input port 112 and the output port 118, the module 102 comprises a forming circuit 128 and a demodulator 129 that perform operations that are the inverse of those performed by the circuit $CF_3$ and the modulator $M_3$, respectively, and between the input port 113 and the output port 119, the module 102 comprises a forming circuit 130 and a demodulator 131 that perform operations that are the inverse of those performed by the circuit $CF_4$ and the modulator $M_4$, respectively.

The receiver 100 performs operations that are the inverse of those described in the case of the transmitter 2. In particular, it is underlined that the operation of the set 8 and of the collimating assembly 10 reception-end is the same as it is transmission-end except that the electromagnetic waves propagate in the opposite direction. The way in which the receiver 100 operates is therefore deduced from the explanations given with regard to the operation of the transmitter 2. In particular, in the receiver 100, the antenna 70 focuses the received electromagnetic wave $OEM_t$ onto the various focal points $FO_i$ and, at the same time, separates the various bands $BW_1$ to $BW_4$ from one another. Thus, the antenna 70 performs over-the-air power demultiplexing. Therefore, the underlined advantages related to the transmitter-end over-the-air power multiplexing apply identically receiver-end but in the context of over-the-air power demultiplexing.

Figure 4:
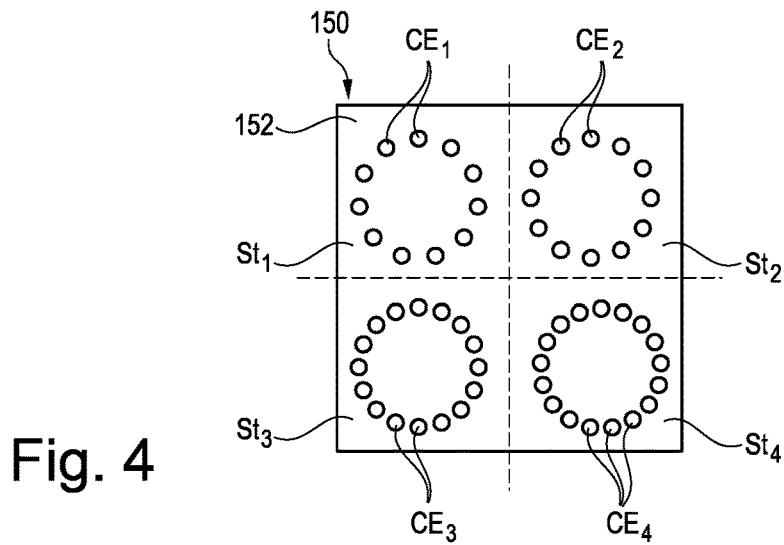
FIG. 4 is a schematic illustration, seen face-on, of another possible embodiment of an antenna for the transmitter of FIG. 1.

FIG. 4 shows the front face 152 of a secondary antenna 150 capable of being used instead of the antenna 70 of the transmitter 2. The antenna 150 is identical to the antenna 70 except that it is produced using only single-band elementary cells $CE_i$. A "single-band" elementary cell is an elementary cell that is solely used to form one discrete lens among the desired four. A single-band elementary cell $CE_i$ is therefore only used to focus a plane electromagnetic wave received along the direction X in the frequency band $BW_i$ on the focal point $FO_i$. In the inverse direction, this single-band elementary cell $CE_i$ is only used to convert a spherical electromagnetic wave radiated in the frequency band BW from the focal point $FO_i$ into a plane electromagnetic wave radiated in the direction X. This single-band elementary cell $CE_i$ is not used to do the same work in the other frequency bands $BW_j$. Under these conditions, the structures and arrangement with respect to one another of the cells $CE_i$ are produced such as to operate only in the single frequency band $BW_i$. This allows the manufacturing constraints of these cells $CE_i$ to be relaxed. In particular, the −3 dB passband of each cell $CE_i$ at least entirely covers the frequency band $BW_i$. In contrast, it has no need to entirely cover other frequency bands $BW_j$. Here, the −3 dB passband of each cell $CE_i$ entirely covers only the frequency band $BW_i$.

The cells $CE_i$ are arranged with respect to one another only so as to convert a spherical electromagnetic wave emitted in the frequency band $BW_i$ from the focal point $FO_i$ into a plane electromagnetic wave radiated in the direction X. In particular, as described above, there are various types of elementary cells $CE_i$. In contrast, the arrangement of the elementary cells $CE_i$ is designed independently of the arrangement of the other elementary cells of the antenna 150 which are used in the other frequency bands $BW_j$. To this end, for example, the front face 152 is divided into four convex sectors $St_1$ to $St_4$ that do not overlap. A convex sector is a region of the front face 152 the envelope of which is convex. Each sector $St_i$ contains only elementary cells $CE_i$. In each sector $St_i$, the various types of elementary cells $CE_i$ are placed, with respect to one another, to form the discrete lens of focal point $FO_i$.

The antenna 150 is simpler to design. In contrast, its radiation efficiency is lower at equal bulk to that of the antenna 70.

Figure 5:
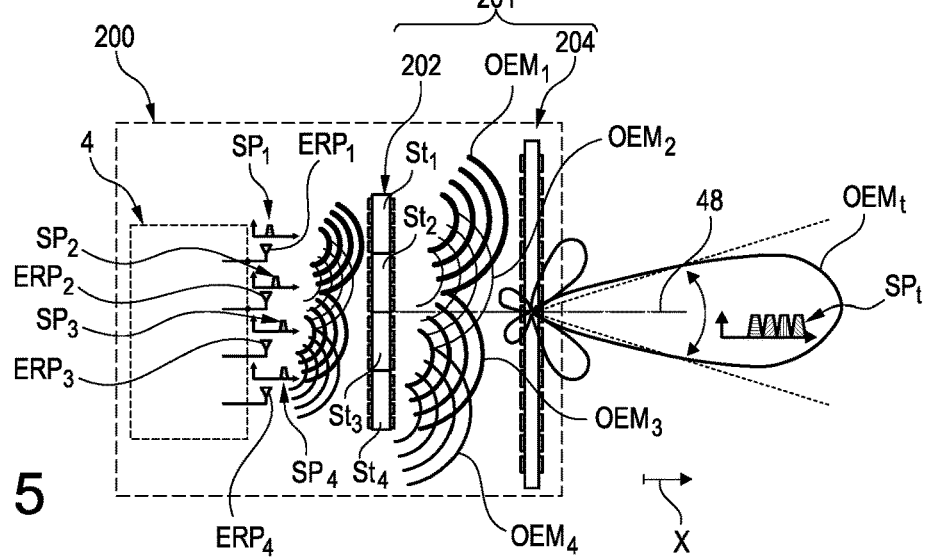
FIGS. 5 and 6 are schematic illustrations of two other possible embodiments of a wireless transmitter that performs frequency multiplexing of channels.

FIG. 5 shows a transmitter 200 that is identical to the transmitter 2, except that the collimating assembly 10 has been replaced by a collimating assembly 201. The collimating assembly 201 comprises an intermediate antenna 202 and a secondary antenna 204 that are placed one after the other in the direction X. The antenna 202 is located between the set 8 and the antenna 204. The antennas 202 and 204 are transmit-array antennas, each centred on the axis 48.

Here, the antenna 202 is, for example, identical to the antenna 150 except that the arrangement of the elementary cells $CE_1$ to $CE_4$ in each of the sectors $St_1$ to $St_4$ is different. As above, the elementary cells in each sector $St_i$ are arranged to form the electromagnetic wave $OEM_i$ in one particular way. Here, this forming carried out by the cells $CE_i$ aims to distribute the power of the wave $OEM_i$ more uniformly over the interior face of the antenna 204. To this end, for example, the cells $CE_i$ of each sector $St_i$ are arranged so that most of the power of the electromagnetic wave $OEM_i$ that they radiate is located in an irradiation cone that entirely contains the interior face of the antenna 204. Here, the periphery of this irradiation cone is adjacent to the periphery of the antenna 204. In addition, the cells $CE_i$ are arranged so that the power of the electromagnetic wave $OEM_i$ radiated in this irradiation cone is as uniform as possible in each cross section of this irradiation cone. Below, the apex of the radiation cone of the cells $CE_i$ of the sector $St_i$ is denoted $SC_i$.

The antenna 204 is, for example, identical to the antenna 70 except that the elementary cells 76 are arranged so that their focal points $FO_{1,204}$ to $FO_{4,204}$ are located at the apexes, $SC_1$ to $SC_4$, respectively, of the irradiation cones of the sectors $St_1$ to $St_4$ of the antenna 202. The symbol $FO_{i,204}$ designates the focal point of the antenna 204 for the frequency band $BW_i$.

This embodiment allows the aperture efficiency of the transmitter to be increased.

Figure 6:
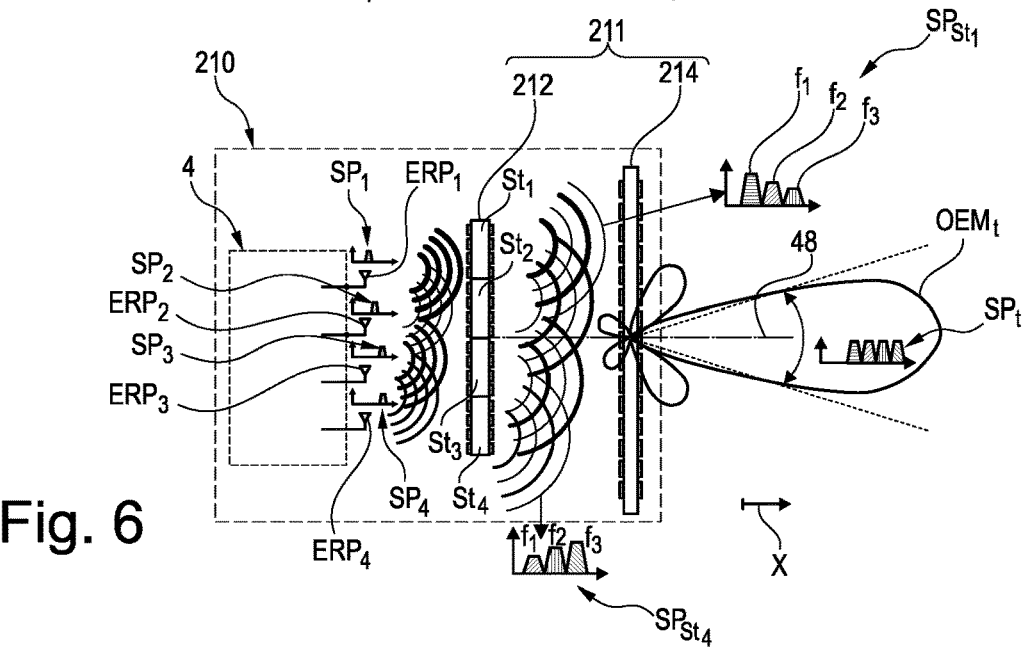

FIG. 6 shows a transmitter 210 that is identical to the transmitter 200, except that the collimating assembly 201 has been replaced by a collimating assembly 211. The collimating assembly 211 comprises an intermediate antenna 212 and a secondary antenna 214. The antennas 212 and 214 are transmit-array antennas centred on the axis 48.

In this embodiment, the antenna 212 is identical to the antenna 202 except that, in each of the sectors $St_i$ the elementary cells $CE_i$ have been replaced by multiband elementary cells 76. The cells 76 of a given sector $St_i$ are arranged with respect to one another to convert the electromagnetic waves emitted from a limited number of primary radiating elements $ERP_i$ into a plane electromagnetic wave transmitted in a common direction. For example, the sector $St_1$ is closest to the radiating element $ERP_1$. In addition, the sector $St_1$ is closer to the radiating elements $ERP_2$ and $ERP_3$ than to the radiating element $ERP_4$. Under these conditions, the cells 76 of the sector $St_1$ are arranged with respect to one another to respectively convert the received electromagnetic waves $OEM_1$, $OEM_2$ and $OEM_3$ into corresponding plane electromagnetic waves that all propagate in the same direction, for example, a direction parallel to the direction X or one directed toward the centre of the antenna 214. Thus, the cells 76 of the sector $St_1$ allow primary over-the-air power multiplexing of the waves $OEM_1$, $OEM_2$ and $OEM_3$ to be performed. Typically, the electromagnetic wave radiated by the sector $St_1$ has a higher power in the band $BW_1$ than in the bands $BW_2$ and $BW_3$ because the element $ERP_1$ is closer to the sector $St_1$ than the elements $ERP_2$ and $ERP_3$. This is illustrated in FIG. 6 by the spectrum $SP_{St1}$.

The cells 76 in the other sectors $St_i$ of the antenna 212 are arranged similarly but to treat other triplets of frequency bands $BW_i$. Most of the power of the electromagnetic wave radiated by the cells 76 of a sector $St_i$ is located in an irradiation cone of apex $SC_i$. What was explained above in the particular case of the sector $St_1$ also applies to the other sectors $St_i$. For example, the spectrum $SP_{St4}$ of the sector $St_4$ is shown in FIG. 6 by way of illustration.

The antenna 214 is identical to the antenna 70 except that its elementary cells 76 are arranged with respect to one another so that each of their focal points $FO_{1,214}$ to $FO_{4,214}$ is located on one respective apex $SC_i$. The symbol $FO_{i,214}$ designates the focal point of the antenna 204 for the frequency band $BW_i$. Under these conditions, secondary over-the-air power multiplexing of these waves $OEM_1$ to $OEM_4$ occurs after the exterior face of the antenna 214.

SECTION II: VARIANTS

Below, the various variants are described in the particular case of a transmitter. However, any variant described in the case of a transmitter may easily be adapted by a person skilled in the art to the case of a wireless receiver that performs frequency demultiplexing of channels, i.e. one such as described with reference to FIG. 3.

Variants of the Transmitting Module:

The widths of the various bands $BW_i$ may be different from one another.

The various bands $BW_i$ are not necessarily contiguous to one another. For example, the band $BW_1$ may be separated from the band $BW_2$ by an unused frequency range.

The transmitting module 4 may be composed of a plurality of mechanically independent integrated circuits, each comprising a single input port $PE_i$ and a single output port $PS_i$. Each of these integrated circuits generates a corresponding electrical signal $SEM_i$. In this case, each of these integrated circuits is soldered to the rear face of the board 50 and directly connected, by a wire link, to the corresponding primary radiating element $ERP_i$.

The module 4 may take forms other than that of an integrated circuit that is able to be soldered to the board 50. For example, the module 4 may also be a circuit board that is independent from the board 50 and connected to the board 50 by way of wire links or solder joints.

In another embodiment, each port $PS_i$ is connected to the primary element $ERP_i$ not by a wire link but by way of electromagnetic coupling. This electromagnetic coupling plays, functionally, the same role as the wire link. For example, it is achieved using coupling slots.

Variants of the Set of Primary Radiating Elements:

As a variant, a plurality of primary radiating elements are connected to the same output port $PS_i$ of the transmitting module 4. In this case, there are more primary radiating elements than output ports. A power splitter is introduced between this port $PS_i$ and the various primary radiating elements connected thereto. In contrast, even in this case, none of the primary radiating elements is connected to a plurality of different output ports of the transmitting module. Thus, even in this case, use of a power combiner is avoided.

In the case where a plurality of primary radiating elements are connected to the same port $PS_i$, the arrangement of these various primary radiating elements forms a source of electromagnetic radiation having an equivalent phase centre from which this electromagnetic radiation is radiated. This equivalent phase centre or equivalent focal point is not, in general, centred on one of its primary radiating elements. For example, it may be located in a plane located behind the plane containing the various primary radiating elements. This is for example the case if the arrangement of these various primary radiating elements connected to the same port $PS_i$ forms a patch antenna. In this case, these primary radiating elements are placed so that the equivalent phase centre of the radiation source that it forms is coincident with the focal point $FO_i$ of the collimating assembly 10.

The number of channels simultaneously transmitted by the transmitter 2 may be lower than four and, for example, as low as two channels. In this case, the transmitting module 4 is simplified. For example, this module 4 comprises only two output ports, i.e. a single output port per channel. In this case, the set 8 of primary radiating elements may itself be simplified. For example, the set 8 then comprises only two primary radiating elements connected to one respective output port.

In contrast, the number of channels of the transmitting module 4 may be higher than four. In this case, the number of output ports and the number of primary radiating elements is increased. At the very least, the number of output ports and the number of primary radiating elements are both equal to the number of channels.

The various primary radiating elements of the set 8 are not necessarily all identical. For example, in another embodiment, each primary radiating element is specially optimized to radiate mainly in the frequency band $BW_i$ in which it must work when it is connected to the output port $PS_i$. The radiation efficiency of this specially optimized primary radiating element is then better when it radiates in the frequency band $BW_i$ than in the other frequency bands. This variant simplifies the design of the set of primary radiating elements since the constraints on each primary radiating element are relaxed.

Other embodiments of the primary radiating elements are possible. For example, the primary radiating elements may also be replaced by slots made in a conductive ground plane or by conductive strips.

The set 8 of primary radiating elements is not necessarily planar. As a variant, it may also extend along a curved surface such as, for example, along a spherical surface.

In one more complex embodiment, the set of primary radiating elements is not printed on the face of a board of a printed circuit board.

Variants of the Collimating Assembly:

As a variant, the planar antenna 70 is replaced by a non-planar secondary antenna. For example, the non-planar secondary antenna is slightly curved. For example, the interior and exterior faces of such a curved secondary antenna extend along the surface of first and second spheres that are both centred on the same point.

The delays introduced by the various energy-transmitting links of the elementary cells 76 may be adjusted so that the common direction X makes an angle of at least 5° or 10° or 25° with respect to the axis 48.

In another embodiment, the delays introduced by the various elementary cells are adjustable by an electronic control unit. In this case, by modifying these adjustments, it is possible to modify the angle that the common direction X makes with the axis 48. An exemplary embodiment of such adjustable elementary cells is for example described in detail in patent application EP3125362B1.

As a variant, each elementary cell 76 modifies, in the same way, the polarization direction of each received wave $OEM_i$. For example, if each of the waves $OEM_i$ has the same rectilinear polarization, each elementary cell 76 converts this rectilinear polarization into a circular polarization. Thus, the electromagnetic waves transmitted via the exterior face of the collimating assembly all have the same polarization direction from the moment that the waves $OEM_i$ received via the interior face of the collimating assembly all have the same polarization direction. However, it is not necessary for the polarization direction of the wave $OEM_i$ received via the interior face 72 to be the same as that of the electromagnetic wave transmitted in the band $BW_i$ by the collimating assembly.

In another embodiment, only the electromagnetic waves radiated in a low number of frequency bands BW are power multiplexed over the air. For example, only electromagnetic waves modulated in the frequency bands $BW_1$ and $BW_2$ are radiated by the collimating assembly in the common direction X. In this case, the over-the-air power multiplexing occurs only for the electromagnetic waves contained in the frequency bands $BW_1$ and $BW_2$. The electromagnetic waves contained in the frequency bands $BW_3$ and $BW_4$ are radiated, by the collimating assembly, in directions that are different from each other and different from the common direction X. Under these conditions, the over-the-air power multiplexing does not occur for the electromagnetic waves radiated in the frequency bands $BW_3$ and $BW_4$. In another variant, the electromagnetic waves contained in the bands $BW_3$ and $BW_4$ are radiated by the collimating assembly in another common direction different from the direction X. In this case, the over-the-air power multiplexing occurs:

on the one hand, for the electromagnetic waves radiated in the bands $BW_1$ and $BW_2$ in the direction X, and on the other hand, for the electromagnetic waves radiated in the bands $BW_3$ and $BW_4$ in the other common direction.

Such an ability to radiate in the direction X only electromagnetic waves modulated in a limited number of frequency bands $BW_1$ and $BW_2$ is for example obtained by placing the primary radiating elements $ERP_1$ and $ERP_2$ corresponding to these frequency bands $BW_1$ and $BW_2$ in proximity to the corresponding focal points $FO_1$ and $FO_2$ and by placing the primary radiating elements $ERP_3$ and $ERP_4$ corresponding to the other frequency bands $BW_3$ and $BW_4$ away from the corresponding focal points $FO_3$ and $FO_4$.

Many other embodiments of the antenna 70 are possible. For example, there are many other possible embodiments of the elementary cells. In particular, the energy-transferring link may be:

an electrical link that electrically connects the interior and exterior radiating elements, or a link for transferring energy between the interior and exterior radiating elements by radiation through one or more slots made in the ground plane that separates these interior and exterior radiating elements.

In particular, exemplary embodiments of elementary cells are described in the following articles:

L. Dussopt et al.: "A V-band switched beam linearly polarized transmit-array antenna for wireless backhaul applications", IEEE Transaction on Antennas and Propagation, vol. 65, no. 12, pp. 6788-6793, December 2017, C. Jouanlanne et al.: "Wideband linearly-polarized transmitarray antenna for 60 GHz backhauling", IEEE Transaction on Antennas and Propagation, vol. 65, no. 3, pp. 1440-1445, March 2017.

In particular, in certain embodiments, the elementary cell comprises no ground plane interposed between its interior and exterior radiating elements.

Another example of a transmit-array antenna in which the elementary cells have a −3 dB passband extending from 124 GHz to 158 GHz is described in the following article: Zhuo-Wei Miao et al.: "140 GHz High-Gain LTCC-Integrated Transmit-Array Antenna Using a Wideband SIW Aperture-Coupling Phase Delay Structure", IEEE TRANSACTIONS ON ANTENNAS AND PROPAGATION, VOL. 66, NO. 1, JANUARY 2018.

For exemplary embodiments of wide-band transmit-array antennas in other frequency ranges, the reader may also consult the following articles:

Yuehe Ge et al.: "Broadband Folded Transmitarray Antenna Based on an Ultrathin Transmission Polarizer" IEEE TRANSACTIONS ON ANTENNAS AND PROPAGATION, VOL. 66, NO. 11, NOVEMBER 2018;

Ahmed H. Abdelrahman: "Bandwidth Improvement Methods of Transmitarray Antennas", IEEE TRANSACTIONS ON ANTENNAS AND PROPAGATION, VOL. 63, NO. 7, JULY 2015;

Seyed Hashem Ramazannia Tuloti et al.: "High-Efficient Wideband Transmitarray Antenna", IEEE ANTENNAS AND WIRELESS PROPAGATION LETTERS, VOL. 17, NO. 5, MAY 2018;

Lin Xiao et al.: "Wideband Planar Tightly Coupled Dipole Transmitarray", 13th European Conference on Antennas and Propagation (EuCAP 2019).

In one particular embodiment, the secondary antenna comprises both single-band elementary cells and multiband elementary cells. In this case, preferably, the single-band elementary cells are located at the centre of the secondary antenna.

In another particular embodiment, the secondary antenna comprises multiband elementary cells the −3 dB passband of which covers a plurality of frequency bands $BW_i$ but not all of them.

The −3 dB passband of the single-band cells $CE_i$ may also cover a plurality of other frequency bands $BW_i$. However, even in this case, the passband of the cells $CE_i$ that is used during operation of the secondary antenna remains solely the frequency band $BW_i$.

Other embodiments of the intermediate transmit-array antenna are possible. For example, the intermediate antenna may also be identical to the antenna 70 except that, for example, it comprises fewer elementary cells.

As a variant, the antenna 214 directs the radiation $OEM_t$ in a direction other than the direction X in which the antenna 212 directs this wave $OEM_t$.

Other Variants:

What has been described here in the particular case of millimetre waves also applies to any electromagnetic wave having frequencies located outside of the band of millimetre waves. To this end, the dimensions of the primary and secondary antennas must be adapted to the frequency of the transmitted electromagnetic waves. For example, what has been described may be adapted to electromagnetic waves having a frequency higher than 1 MHz or 100 MHz and lower than 110 GHz. It may also be adapted to the case of electromagnetic waves having a frequency higher than GHz and, for example, lower than 300 GHz.

As a variant, the receiver used to receive the wave $OEM_t$ is produced differently. For example, the receiver may comprise, in succession, a power combiner and a power splitter. For example, the receiver is designed just like the transmitter described in article A1 but with the transmitting module replaced by a receiving module. This receiving module multiplexes the power received in each of the channels using, to this end, a power combiner followed by a power splitter in order to transmit only the portion of the electrical signal which is comprised in the frequency band $BW_i$ to the corresponding demodulator. The receiver may also be a conventional receiver produced using a horn antenna able to implement frequency demultiplexing of channels.

Reciprocally, a conventional transmitter performing frequency multiplexing of channels may be used to radiate the wave $OEM_t$ received by the receiver 100. For example, the conventional transmitter is identical to that described in article A1.

SECTION III: ADVANTAGES OF THE DESCRIBED EMBODIMENTS

The advantages described here in the particular case of the transmitter apply identically in the case of the wireless receivers described here.

In the various embodiments described here, the power multiplexing of the modulated signals is achieved by what is referred to in this patent application as over-the-air power multiplexing. Specifically, it has been observed that, when the collimating assembly is configured to radiate the electromagnetic waves modulated in different frequency bands in a common direction, then the plane electromagnetic wave resulting in this direction is the same, or practically the same, as that generated, for example, by the transmitter of article A1. Thus, the transmitter described here has a high directivity and a high gain in this propagation direction and a wide passband.

The transmitter described here exhibits lower losses than the transmitter described in article A1. Therefore, the transmitters described here have a higher radiation efficiency. Specifically, the over-the-air power multiplexing generates fewer losses than when a power combiner is employed to perform the same operation, especially in the millimetre band.

In addition, since in the described embodiments, contrary to what was done in article A1, no power combiner is employed, the electrical connections between the output ports $PS_1$ to $PS_4$ and the various radiating elements $ERP_1$ to $ERP_4$ are much shorter. This decreases insertion losses and also plays a part in improving radiation efficiency.

The fact that the −3 dB passband of certain elementary cells covers a plurality of frequency bands $BW_i$ allows the same multiband elementary cell to be used to process electromagnetic waves radiated in various frequency bands $BW_i$. This increases, at equal bulk, the radiation efficiency with respect to the embodiment of FIG. 4.

Using multiband elementary cells the passband of which covers the entirety of the frequency bands BW allows the radiation efficiency of the transmitter to be increased yet further. In addition, this allows, at equal radiation efficiency, the bulk of the antenna 70 and therefore of the transmitter 2 to be decreased.

Distributing single-band elementary cells in the same sector of the secondary antenna simplifies the design of the secondary antenna.

Using a printed circuit board to produce the transmit-array antenna allows its manufacture to be simplified, its bulk to be limited and its cost to be decreased.

Producing the primary radiating elements on the front face of a printed circuit board and fastening the transmitting module to the rear face of the same board allows the bulk of the transmitter to be substantially decreased, and interconnection losses between the transmitting module and the primary radiating elements to be decreased.

The fact that the set of primary radiating elements comprises as many primary radiating elements as there are output ports allows each output port to be directly connected to a single primary radiating element. In this case, it is not necessary to use a power splitter between this output port and the various primary radiating elements that are connected thereto. The absence of a power splitter further increases the radiation efficiency of the transmitter.

The invention claimed is:

1. A wireless transmitter that performs frequency multiplexing of channels, said transmitter comprising:
   a multichannel transmitting module comprising at least first and second output ports and configured to simultaneously generate, on each of these first and second output ports, respectively, first and second electrical signals that are modulated depending on data to be transmitted over first and second specific channels, respectively, most of a power of the first and second generated modulated electrical signals being comprised in first and second separate reserved frequency bands, respectively,
   a set of primary radiating elements comprising at least first and second primary radiating elements that are electrically connected to the first and second output ports of the transmitting module, the first and second primary radiating elements being configured to convert, respectively, the first and second modulated electrical signals into first and second electromagnetic waves that are radiated into space, respectively, most of the power of these first and second electromagnetic waves being comprised in the first and second frequency bands, respectively,
   wherein:
   the transmitter comprises a transmit-array collimating assembly, said collimating assembly being configured:
      to convert an electromagnetic wave radiated from a first focal point and in the first frequency band, into a plane electromagnetic wave of same frequency radiated in a preset first direction, and to convert an electromagnetic wave radiated from a second focal point and in the second frequency band, into a plane electromagnetic wave of same frequency radiated in the same preset first direction, said direction being common to these first and second frequency bands, the first and second focal points are located on the side of the set of primary radiating elements and occupy different spatial positions, the first and second primary radiating elements are solely connected to the first and second output ports, respectively, the first and second primary radiating elements are positioned, with respect to the collimating assembly, so as to radiate the first and second electromagnetic waves from the first and second focal points, respectively, and the primary radiating elements are configured to radiate the electromagnetic waves in the first and second frequency bands with identical polarization directions and the collimating assembly is configured to preserve said identity between the polarization directions of the radiated electromagnetic waves.

2. The transmitter according to claim 1, wherein the collimating assembly comprises a secondary antenna, comprising:
an interior face turned toward the set of primary radiating elements,
an exterior face located on a side opposite the interior face,
at least four different types of elementary cells, each elementary cell comprising:
an interior radiating element placed on the interior face,
an exterior radiating element placed on the exterior face,
a link for transferring energy between the interior radiating element and the exterior radiating element of said elementary cell, said link being arranged to introduce a preset delay into said energy transfer between the interior and exterior radiating elements of said elementary cell,
two elementary cells of different types being two elementary cells in which the preset delays, for a given frequency band chosen from a group composed of the first and second frequency bands, have different values,
said elementary cells of various types being placed with respect to one another so as:
to convert the first and second electromagnetic waves into plane electromagnetic waves radiated via the exterior face and directed in the first direction, and
to convert a plane electromagnetic wave received via its exterior face along the first direction and in the first and second frequency bands into the first and second electromagnetic waves radiated via the interior face, respectively.

3. The transmitter according to claim 2, wherein at least certain of the elementary cells of the secondary antenna are multiband elementary cells used to convert both the first and second electromagnetic waves into plane electromagnetic waves radiated in the first direction, these multiband elementary cells each having a −3 dB passband that entirely covers the first and second frequency bands and being such that the preset delays introduced into each of these first and second frequency bands are different, these multiband elementary cells being placed in a region of overlap between a first sector of the secondary antenna containing all of and only the elementary cells used to convert the first electromagnetic wave into a plane wave radiated in the first direction and a second sector of the secondary antenna containing all of and only the elementary cells used to convert the second electromagnetic wave into a plane wave radiated in the first direction.

4. The transmitter according to claim 3, wherein the secondary antenna comprises solely multiband elementary cells and the first and second sectors of the secondary antenna coincide.

5. The transmitter according to claim 2, wherein:
all the elementary cells of the secondary antenna that are used to convert the first electromagnetic wave into a plane wave radiated in the first direction are placed, to said end, solely in a first convex sector of the secondary antenna containing all of and only the elementary cells used to convert the first electromagnetic wave into a plane wave radiated in the first direction, and
all the elementary cells of the secondary antenna that are used to convert the second electromagnetic wave into a plane wave radiated in the first direction are placed, to said end, solely in a second convex sector of the secondary antenna containing all of and only the elementary cells used to convert the second electromagnetic wave into a plane wave radiated in the first direction, said second sector not overlapping the first sector,
the elementary cells placed in the first sector each having a −3 dB passband that entirely covers the first frequency band and the elementary cells placed in the second sector each having a −3 dB passband that entirely covers the second frequency band.

6. The transmitter according to claim 2, wherein the collimating assembly comprises, in addition to the secondary antenna, an intermediate transmit-array antenna interposed between the set of primary radiating elements and the secondary antenna, said intermediate antenna comprising:
an interior face turned toward the set of primary radiating elements,
an exterior face turned toward the interior face of the secondary antenna,
at least four different types of elementary cells, these elementary cells of various types being placed with respect to one another so as:
to convert the first and second electromagnetic waves received via the interior face of the intermediate antenna into plane electromagnetic waves that are radiated, via the exterior face of the intermediate antenna, in a common second direction toward the interior face of the secondary antenna, and
to convert a plane electromagnetic wave received via the exterior face of the intermediate antenna along the common second direction and in the first and second frequency bands into, respectively, the first and second electromagnetic waves radiated via the interior face of the intermediate antenna toward the first and second focal points, respectively.

7. The transmitter according to claim 2, wherein the collimating assembly comprises, in addition to the secondary antenna, an intermediate transmit-array antenna interposed between the set of primary radiating elements and the secondary antenna, said intermediate antenna comprising:
an interior face turned toward the set of primary radiating elements,
an exterior face turned toward the interior face of the secondary antenna,
at least four different types of elementary cells, these elementary cells of various types being placed with respect to one another so as to convert the first and second electromagnetic waves into electromagnetic waves radiated via the exterior face of the intermediate antenna, irradiation cones of these electromagnetic waves each entirely containing, both in the first and in the second frequency band, the interior face of the secondary antenna.

8. The transmitter according to claim 2, wherein interior and exterior faces of the secondary antenna are the faces of a printed circuit board comprising at least two metallization layers, the interior and exterior radiating elements being produced by etching the metallization layer located on the interior and exterior faces of the printed circuit hoard, respectively.

9. The transmitter according to claim 8, wherein each elementary cell of the secondary antenna also comprises a ground plane lying between each interior and exterior radiating element, said ground plane being produced in an inter mediate metallization layer located between the metallization layers used to produce the interior and exterior radiating elements.

10. The transmitter according to claim 1, wherein the set of primary radiating elements comprises a single first and a single second primary radiating element.

11. The transmitter according to claim 1, wherein:
the set of primary radiating elements comprises a printed circuit board having a front face turned toward the collimating assembly and a rear face on the opposite side,
the primary radiating elements are produced in a metallization layer of the front face of said board,
the transmitting module is fastened to the rear face of said printed circuit board, and
the primary radiating elements are electrically connected to the respective output or input ports by way of electrical vias that pass through a thickness of said printed circuit board or the primary radiating elements are electrically connected to the respective output or input ports by way of respective electromagnetic couplings through the thickness of said printed circuit board.

12. A wireless receiver that performs frequency demultiplexing of channels, said receiver comprising:
a multichannel receiving module comprising at least first and second input ports and configured to simultaneously receive, via each of these first and second input ports, respectively, first and second electrical signals that are modulated depending on data transmitted over first and second specific channels, respectively, most of a power of the first and second received modulated electrical signals being comprised in first and second separate reserved frequency bands, respectively,
a set of primary radiating elements comprising at least first and second primary radiating elements that are electrically connected to the first and second input ports of the receiving module, the first and second primary radiating elements being configured to convert, respectively, first and second electromagnetic waves radiated into space in the first and second frequency bands, respectively, into first and second modulated electrical signals, respectively, most of the power of these first and second electromagnetic waves being comprised in the first and second frequency bands, respectively, wherein:
the receiver comprises a transmit-array collimating assembly, said collimating assembly being configured:
to convert a plane electromagnetic wave received along a preset first direction and in the first frequency band, into the first electromagnetic wave directed toward a first focal point, and
to convert a plane electromagnetic wave received along the same preset first direction and in the second frequency band, into the second electromagnetic wave directed toward a second focal point,
the first and second focal points are located on the side of the set of primary radiating elements and occupy different spatial positions,
the first and second primary radiating elements are solely connected to the first and second input ports, respectively,
the first and second primary radiating elements are positioned, with respect to the collimating assembly, so as to receive the first electromagnetic wave directed toward the first focal point and the second electromagnetic wave directed toward the second focal point, respectively, and
the collimating assembly is configured to preserve an identity between polarization directions of the electromagnetic waves received in the first and second frequency bands and the first and second primary radiating elements are configured to convert the first and second electromagnetic waves received in the first and second frequency bands with identical polarization directions.

13. The receiver according to claim 12, wherein the collimating assembly comprises a secondary antenna, comprising:
an interior face turned toward the set of primary radiating elements,
an exterior face located on a side opposite the interior face,
at least four different types of elementary cells, each elementary cell comprising:
an interior radiating element placed on the interior face,
an exterior radiating element placed on the exterior face,
a link for transferring energy between the interior radiating element and the exterior radiating element of said elementary cell, said link being arranged to introduce a preset delay into said energy transfer between the interior and exterior radiating elements of said elementary cell,
two elementary cells of different types being two elementary cells in which the preset delays, for a given frequency band chosen from a group composed of the first and second frequency bands, have different values,
said elementary cells of various types being placed with respect to one another so as:
to convert the first and second electromagnetic waves into plane electromagnetic waves radiated via the exterior face and directed in the first direction, and
to convert a plane electromagnetic wave received via its exterior face along the first direction and in the first and second frequency bands into the first and second electromagnetic waves radiated via the interior face, respectively.

14. The receiver according to claim 13, wherein at least certain of the elementary cells of the secondary antenna are multiband elementary cells used to convert both the first and second electromagnetic waves into plane electromagnetic waves radiated in the first direction, these multiband elementary cells each having a −3 dB passband that entirely covers the first and second frequency bands and being such that the preset delays introduced into each of these first and second frequency bands are different, these multiband elementary cells being placed in a region of overlap between a first sector of the secondary antenna containing all of and only the elementary cells used to convert the first electromagnetic wave into a plane wave radiated in the first direction and a second sector of the secondary antenna containing all of and only the elementary cells used to convert the second electromagnetic wave into a plane wave radiated in the first direction.

15. The receiver according to claim 14, wherein the secondary antenna comprises solely multiband elementary cells and the first and second sectors of the secondary antenna coincide.

16. The receiver according to claim 13, wherein:
all the elementary cells of the secondary antenna that are used to convert the first electromagnetic wave into a plane wave radiated in the first direction are placed, to said end, solely in a first convex sector of the secondary antenna containing all of and only the elementary cells used to convert the first electromagnetic wave into a plane wave radiated in the first direction, and
all the elementary cells of the secondary antenna that are used to convert the second electromagnetic wave into a plane wave radiated in the first direction are placed, to said end, solely in a second convex sector of the secondary antenna containing all of and only the elementary cells used to convert the second electromagnetic wave into a plane wave radiated in the first direction, said second sector not overlapping the first sector,
the elementary cells placed in the first sector each having a −3 dB passband that entirely covers the first frequency band and the elementary cells placed in the second sector each having a −3 dB passband that entirely covers the second frequency band.

17. The receiver according to claim 13, wherein the collimating assembly comprises, in addition to the secondary antenna, an intermediate transmit-array antenna interposed between the set of primary radiating elements and the secondary antenna, said intermediate antenna comprising:
an interior face turned toward the set of primary radiating elements,
an exterior face turned toward the interior face of the secondary antenna,
at least four different types of elementary cells, these elementary cells of various types being placed with respect to one another so as:
to convert the first and second electromagnetic waves received via the interior face of the intermediate antenna into plane electromagnetic waves that are radiated, via the exterior face of the intermediate antenna, in a common second direction toward the interior face of the secondary antenna, and
to convert a plane electromagnetic wave received via the exterior face of the intermediate antenna along the common second direction and in the first and second frequency bands into, respectively, the first and second electromagnetic waves radiated via the interior face of the intermediate antenna toward the first and second focal points, respectively.

18. The receiver according to claim 13, wherein the collimating assembly comprises, in addition to the secondary antenna, an intermediate transmit-array antenna interposed between the set of primary radiating elements and the secondary antenna, said intermediate antenna comprising:
an interior face turned toward the set of primary radiating elements,
an exterior face turned toward the interior face of the secondary antenna,
at least four different types of elementary cells, these elementary cells of various types being placed with respect to one another so as to convert the first and second electromagnetic waves into electromagnetic waves radiated via the exterior face of the intermediate antenna, irradiation cones of these electromagnetic waves each entirely containing, both in the first and in the second frequency band, the interior face of the secondary antenna.

19. The receiver according to claim 13, wherein the interior and exterior faces of the secondary antenna are the faces of a printed circuit board comprising at least two metallization layers, the interior and exterior radiating elements being produced by etching the metallization layer located on the interior and exterior faces of the printed circuit board, respectively.

20. The receiver according to claim 19, wherein each elementary cell of the secondary antenna also comprises a ground plane lying between each interior and exterior radiating element, said ground plane being produced in an intermediate metallization layer located between the metallization layers used to produce the interior and exterior radiating elements.

21. The receiver according to claim 12, wherein the set of primary radiating elements comprises a single first and a single second primary radiating element.

22. The receiver according to claim 12, wherein:
the set of primary radiating elements comprises a printed circuit board having a front face turned toward the collimating assembly and a rear face on the opposite side,
the primary radiating elements are produced in a metallization layer of the front face of said board,
the receiving module is fastened to the rear face of said printed circuit board, and
the primary radiating elements are electrically connected to the respective output or input ports by way of electrical vias that pass through a thickness of said printed circuit board or the primary radiating elements are electrically connected to the respective output or input ports by way of respective electromagnetic couplings through the thickness of said printed circuit board.

* * * * *